United States Patent [19]

Fey et al.

[11] Patent Number: 4,862,395
[45] Date of Patent: Aug. 29, 1989

[54] DATA DISPLAY INSTRUMENT FOR A BICYCLE

[75] Inventors: Rainer Fey, Schweinfurt; Günter Look, Bergrheinfeld; Gerhard Dumbser, Niederwerrn, all of Fed. Rep. of Germany

[73] Assignee: Sachs-Huret S.A.

[21] Appl. No.: 68,358

[22] Filed: Jun. 29, 1987

[30] Foreign Application Priority Data

Jul. 5, 1986 [DE] Fed. Rep. of Germany ....... 3622632

[51] Int. Cl.⁴ .......................... G06M 3/06; G01P 3/48; A63B 21/00; G01C 22/00
[52] U.S. Cl. .................................. 364/561; 364/565; 272/73; 340/721; 340/754; 340/323 R; 340/432; 377/24.2; 324/166
[58] Field of Search ...................... 364/561, 565, 442; 340/721, 753, 754, 323 R, 134; 324/166, 174; 368/10, 69, 70; 377/20, 24, 24.1, 24.2; 272/73

[56] References Cited

U.S. PATENT DOCUMENTS

| | | | |
|---|---|---|---|
| 4,071,892 | 1/1978 | Genzling | 364/561 X |
| 4,254,489 | 3/1981 | Azzam | 340/753 X |
| 4,371,945 | 2/1983 | Karr et al. | 364/561 |
| 4,387,437 | 6/1983 | Lowrey et al. | 364/565 X |
| 4,443,008 | 4/1984 | Shimano | 272/73 |
| 4,463,355 | 7/1984 | Schultz et al. | 340/754 X |
| 4,559,534 | 12/1985 | Nickol | 340/754 |
| 4,633,216 | 12/1986 | Tsuyama | 324/174 X |
| 4,636,769 | 1/1987 | Tsuyama | 324/174 X |
| 4,638,448 | 1/1987 | Cuvelier et al. | 361/561 X |
| 4,642,606 | 2/1987 | Tsuyama | 324/174 X |
| 4,642,787 | 2/1987 | McCarthy et al. | 364/424 X |
| 4,663,718 | 5/1987 | Augello et al. | 364/442 X |
| 4,671,671 | 6/1987 | Suetaka | 368/10 X |
| 4,701,867 | 10/1987 | Brüggemann | 364/550 |
| 4,740,905 | 4/1988 | Murakami et al. | 324/166 X |
| 4,780,864 | 10/1988 | Houlihan | 340/134 |

FOREIGN PATENT DOCUMENTS

| | | |
|---|---|---|
| 0151382 | 8/1985 | European Pat. Off. . |
| 0151383 | 8/1985 | European Pat. Off. . |
| 0151391 | 8/1985 | European Pat. Off. . |

OTHER PUBLICATIONS

Prospect Cateye Solar Modell CC-2000, 4 pages (1982).
Patent Abstracts of Japan, vol. 10, No. 154 (p-463) [2210], Jun. 4, 1986.
Electronic Engineering, vol. 56, No. 687, Mar. 1984, pp. 169-172; P. Yates "Odometer Using Non-Volatile Memory".

Primary Examiner—Parshotam S. Lall
Assistant Examiner—Joseph L. Dixon
Attorney, Agent, or Firm—Toren, McGeady & Associates

[57] ABSTRACT

The data display instrument for a bicycle comprises an LCD field having an analog scale field to display the momentary travelling speed and an analog scale field to display the pedalling speed. The scale fields are automatically switchable to two measuring ranges. Furthermore, two digital numerical fields are provided in which a multiplicity of information concerning the riding situation can be displayed in dependence on the travelling speed. In addition to the momentary speed and the momentary pedalling speed which are displayed in the scale fields, the digital fields will during travel display the distance travelled since a last reset and the average speed. Immediately after the bicycle comes to a standstill, the digital fields will indicate the travelling time since the last reset and the maximum speed. After a predetermined period of time has elapsed during which the bicycle continues to remain immobile, the digital fields will indicate the total distance travelled and the wheel diameter. For switchover between individual operating modes, a single operating key is provided which switches over the operating modes as the result of short or medium or prolonged actuation and which can erase the memories for distance travelled since the last reset, average speed, travelling time since the last reset and maximum speed, or set the instrument to an operating mode for programming the wheel diameter. The data display instrument facilitates reading of the data and so makes a contribution to cycling safety.

9 Claims, 2 Drawing Sheets

DATA DISPLAY INSTRUMENT FOR A BICYCLE

BACKGROUND OF THE INVENTION

The invention relates to a data display instrument for a bicycle.

Already known from European Patent Application Nos. 150,382, 150,383 and 151,391 is a data display instrument for a bicycle which displays data of interest when running the bicycle such as, for example, the actual or current travelling speed, the pedalling speed, the average travelling speed, the distance travelled since a last reset, for example in a day, the total distance travelled, the time spent cycling during the day, the maximum travelling speed and the wheel diameter. A microprocessor computes the data as a function of impulse signals generated by a wheel revolution sensor and a pedal revolution sensor. The display is effected in two digital numerical LCD display fields. The known data display instrument is provided with a plurality of keys for manually calling up the data for display. In particular, an operating mode key is provided by means of which the data display modes can be cyclically shifted by repeated depression in a predetermined sequence. This method of operation does however adversely affect the riding safety, since shifting requires one hand to be taken from the handlebars and at the same time the rider must divert his glance from the road to the instrument which is mostly mounted on the handlebars.

From other bicycle data display instruments available on the market it is known to display a plurality of data successively in an automatically followed sequence and at a constant rhythm. It is true that this mode of operation facilitates operation of the instrument but it does however have the disadvantage that in order to read off a specific type of information, the rider's eye must be directed at the instrument for a comparatively long time before the desired display appears in the display field. Riding safety is correspondingly adversely affected.

The invention is directed towards provision of a data display instrument for a bicycle which can be more easily operated than hitherto so that riding safety is less adversely affected than in the past. Furthermore, it is intended to ensure that the data display instrument be more easily readable than hitherto.

SUMMARY OF THE INVENTION

The data display instrument according to the invention indicates a plurality of data modes. While the bicycle is being ridden however only those data modes are displayed which are of importance at the moment of actually riding the bicycle. These data modes are simultaneously depicted on a display means which is preferably constructed as a liquid crystal display field (LCD). The types of information in this group can in particular be the actual or current travelling speed, the actual pedal rotational speed, the average travelling speed and the distance travelled since the last reset of the instrument, for example in one day.

A second group of data such as, for example, travelling time since the last reset of the instrument and the maximum travelling speed attained since the last reset can be indicated immediately after the bicycle has come to a standstill. Switching the display means from the first group to the second group takes place automatically. Since the switchover is made while the bicycle is stationary, riding safety is not adversely affected.

The number of data modes displaced can be further increased if, after a predetermined period has elapsed following the bicycle coming to a standstill, a third group of information is displayed instead of the information in the second group using the display field previously used for the second group.

In order to facilitate reading of the data while the bicycle is being ridden, particularly important modes of data such as, for example, the actual travelling speed and the actual pedalling speed, are indicated in the form of analog scale fields while the other types of information are displayed in digital fields. All the previously explained types of data can in this way be indicated by two analog scale fields and two digital numerical fields without the data display instrument having to be manually operated.

In a preferred embodiment, operation of the data display instrument requires only a single operating key by means of which, by successive brief depression of the key, the groups of data can be called up in a cyclic sequence. Depressing the key for longer periods, for example of two seconds' duration, data stored in the instrument and relating to travelling time since last reset, distance travelled since last rest, average speed and maximum speed can be cancelled or reset. Finally, particularly prolonged depression of the key for more than four seconds, for instance, can set the instrument in a programming condition in which the value of the wheel diameter which is required for computing some of the data can be adjusted. Adjustment of the wheel diameter can in turn be carried out by repeated depression of the same operating key for calling up diameter values stored in a read only memory in a cyclic sequence.

In a preferred embodiment of the data display instrument, the ranges of measurement for actual travelling speed and actual pedalling speed are automatically shifted when predetermined limit values are exceeded. In order to avoid constant shifting of the travelling speed at levels of speed in the region of the limit value, there is expediently provision for no switchback from the higher to the lower speed range if the speed should fall below the limit value, such a switchback occurring only when the bicycle is stationary. The travelling speed scale is expediently constructed as a pointer scale, while the pedal speed scale is a bar scale with a varying bar length. The transition from one value to the next is expediently not abrupt but occurs in a plurality of successive steps.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE DRAWINGS

Figure 1:
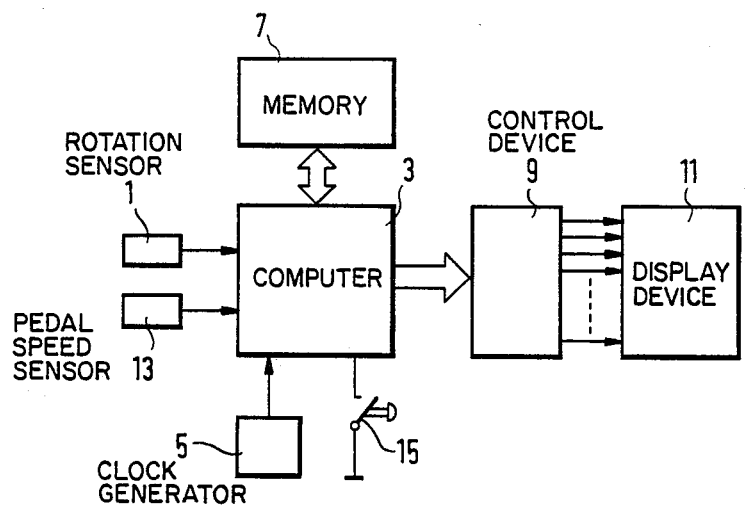
FIG. 1 is a diagrammatic circuit drawing of a data display instrument for a bicycle.

As shown in FIG. 1, the data display instrument comprises a preferably contactless wheel revolution or rotation sensor 1 which responds to the rotation of one wheel of the bicycle, generating a pulse signal, the pulse rate of which is proportional to the rotary speed of the wheel. A computer 3, preferably a microprocessor, provides a data signal in response to the clock frequency of a clock generator 5 and a wheel diameter information stored in a memory 7. The data signal represents the actual or current travelling speed and is fed via a control means 9, which will be explained in greater detail hereinafter, to a visual display device 11. The control device 9 may be a part of the computer 3 or the programme thereof. Similarly, for display on a display field of the display device 11, the computer 3 provides a plurality of further data signals. In detail, the computer 3 provides a data signal corresponding to the actual or current pedalling rotational speed in response to a pulse signal which is generated at a pulse rate proportional to the pedalling speed by a preferably contactless pedal speed sensor 13. The computer 3 further provides, by counting pulses of the wheel rotation sensor 1, the total distance travelled by the bicycle and also the distance travelled since a last reset, for example in a day. The distances travelled are stored in the memory 7, the value for the distance travelled since the last reset being cancelled out or reset by actuation of a single operating key 15, as explained hereinafter. Furthermore, a data signal for the average travelling speed since the last reset is ascertained, stored in the memory 7 and indicated in the display device 11. Finally, the travelling time during which the distance travelled since the last reset was completed, is ascertained by counting clock pulses of the clock generator 5, stored in the memory 7 and indicated in the display device 11. The computer 3 furthermore makes it possible to ascertain, store in the memory 7 and indicate in the display device 11, the maximum travelling speed travelled since the last reset. The values for average travelling speed, travelling time and maximum travelling speed stored in the memory 7 are cancelled from the memory or reset to zero by actuation of the operating key 15, along with the value for the distance travelled since the last reset.

Figure 2:
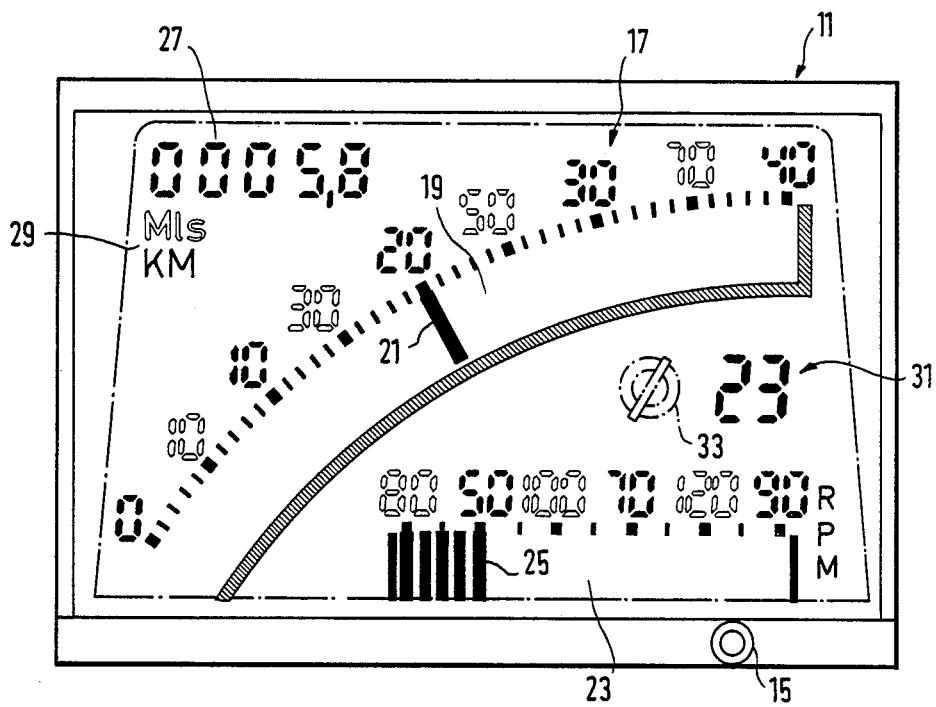
FIG. 2 shows an LCD display field on the data display instrument.

As FIG. 2 shows, the display device 11 comprises a substantially rectangular liquid crystal display (LCD) field 17 with a substantially diagonally extending curved analog scale field 19 for displaying the actual travelling speed at any given time. The scale field 19 is arranged for the display of a single pointer segment 21 and the display of digits for two measuring ranges. The smaller measuring range in the example of embodiment illustrated extends from 0 to 40 kph (kilometers per hour), the associated measured numbers being shown by solid lines. The greater measuring range extends from 0 to 80 kph. Its figures are depicted by peripheral lines, since the digits of the two measuring ranges are only shown when the associated measuring range is switched on.

The LCD field 17 comprises a second analog scale field 23 for displaying the actual pedal speed in the form of a bar scale in which the number of indicated pointer elements 25 increases as the pedalling speed increases. Also the scale field 23 makes it possible to show two measuring ranges, of which the lower measuring range displays values between 40 and 90 rpm while the higher measuring range displays values between 80 and 130 rpm. The scale field 23 is accommodated on the inside of the arcuate scale field 19.

On the outside of the scale field 19 there is, in the top left-hand corner of the LCD field 17, a digital numerical display field 27 on which, according to the programming o a symbol 29, it is possible to display the distance travelled since the last reset, in km or miles. According to the operating condition of the data display instrument, it is possible furthermore to display the total distance travelled or the travelling time since the last reset in the digital field 27.

On the inside of the arcuate scale field 19, between the scale fields 19 and 23, there is a further digital numerical field 31 on which, according to the operating condition of the data display instrument, either the average travelling speed or the maximum travelling speed or the wheel diameter to which the instrument is set, can be shown. When displaying the wheel diameter, a diameter symbol 33 also appears on the LCD field 17.

Figure 3:
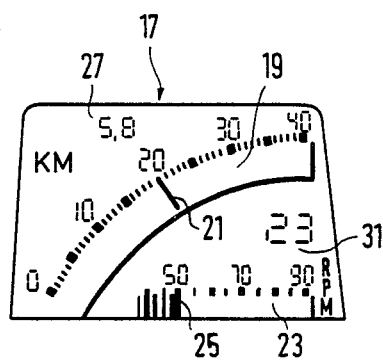
FIG. 3 shows the display field in a first mode of operation and during travelling.

Hereinafter, the mode of operation of the data display instrument will be explained with reference to FIGS. 3 to 8, each of which shows the LCD field 17. When riding off from a standstill, the control device 9 selects a first mode of operation. As FIG. 3 shows, in the first mode of operation the scale field 19 displays the actual travelling speed, in FIG. 3 20 kph, and on the scale field 23 is shown the actual pedalling speed, in FIG. 3 50 rpm. With increasing travelling speed, the pointer segment 21 moves stepwise along the scale field 19, the computer 3 ensuring that the steps follow one another at constant intervals of, for instance, 0.1 seconds regardless of whether the actual variation in speed occurs more rapidly. In this way, it is possible to achieve a visual display which is bereft of momentary fluctuations. In order to suppress inaccuracies of display at very low cycling speeds, the pointer segment 21 only responds at speeds of more than 4 kph, in which case it then travels at a cadence of about 0.5 seconds up to the 4 kph mark of the scale field 19. The same considerations apply correspondingly to braking, both above and also below the speed level of 4 kph (corresponding to 2.5 mph). In the first mode of operation which is automatically set during riding, the digital field 27 shows the distance travelled since the last reset in a five-figure display, in FIG. 3 5.8 km. In a two-digit display, the numerical field 31 shows the average speed travelled during the distance travelled that day in FIG. 3 23 kph.

Figure 4:
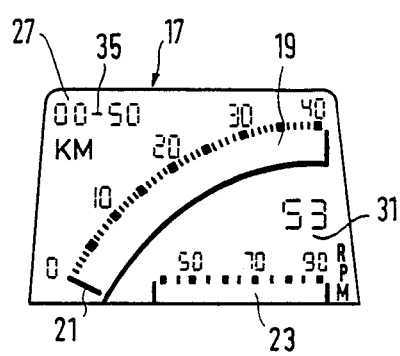
FIG. 4 shows the display field in a second mode of operation immediately after the bicycle has come to a standstill.

FIG. 4 shows the LCD field 17 in a second mode of operation which is automatically set after the brakes are applied and the bicycle brought to a stop. As soon as the pointer segment 21 of the scale field 19 has moved back to the speed level zero, i.e. once the speed has fallen below 4 kph, the control device 9 shifts the display device 11 into the second mode of operation. The digital field 27 shows the time taken to travel the distance since the last reset, the display being in hours and minutes, separated by a line 35, in the example of FIG. 4 zero hours and 50 minutes. At the same time, the digital field 31 shows the maximum speed so far travelled since the last reset, in this case 53 kph. With the bicycle at a standstill, calculation of the average speed and the travelling time since the last reset are stopped until riding is resumed.

Figure 5:
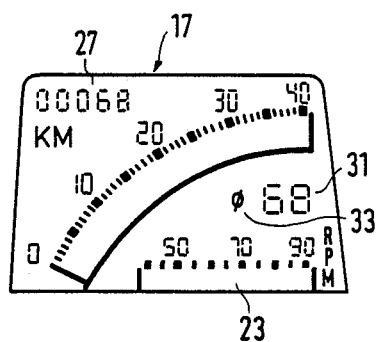
FIG. 5 shows the display field in a third mode of operation several seconds after the bicycle has come to a standstill.
Figure 6:
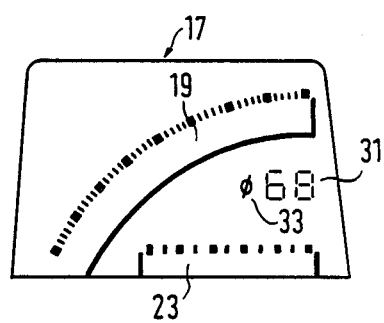
FIG. 6 shows the display field in a fourth mode of operation in which the wheel diameter can be programmed.

The second operating condition which is set directly after the speed display reaches zero is only maintained for a predetermined period after the bicycle actually comes to a standstill, in this case 8 seconds. When the 8 seconds have elapsed, if the stoppage persists, the control device shifts the display device 11 into a third operating mode in which the numerical field 27, as FIG. 5 shows, displays the total distance travelled, in this case 68 km. At the same time, in the third operating mode, the numerical field 31 shows the wheel diameter on which the calculations are based, in this case 68 cm and also the diameter symbol 33.

A fourth mode of operation (FIG. 6) is set by depressing the operating key 15 for longer than 4 seconds. In the fourth mode of operation, the numerical field 27 and all display segments 21, 25 disappear, together with the figures on the scale fields 19 and 23. The numerical field 31 indicates the wheel diameter and at the same time the diameter symbol 33 is shown. By repeated successive actuation of the operating key 15, it is possible one after another to call up to the digital field 31 the values for programmable wheel diameter which are stored in the memory 7. If no wheel diameter value is called up for more than 4 seconds, then the control device 9 switches the display device 11 back to the third operating mode (FIG. 5) and the last shown wheel diameter is taken as a basis for further calculations during operating of the bicycle.

Figure 7:
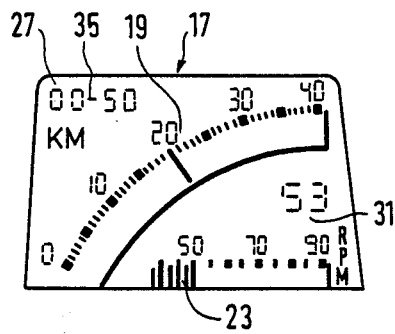
FIG. 7 shows the display field in the first mode of operation at increased pedal speed.
Figure 8:
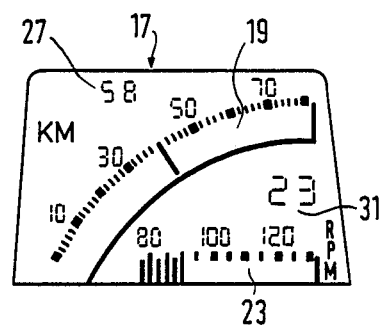
FIG. 8 shows the display field in the first mode of operation at increased pedal speed and increased momentary speed.

By repeated brief actuation of the operating key 15, it is possible cyclically to shift the operating modes in the sequence 1 - 2 - 3 - 1, etc. The scale fields 19, 23 are not influenced by shifting of the operating modes, subject to the exception explained hereinafter. FIG. 7 shows the travelling situation according to FIG. 3 in which by a single brief actuation of the operating key 15, the instrument is switched from the first operating mode shown in FIG. 3 to the second operating mode shown in FIG. 4. While the scale field 19 shown in FIG. 3 indicates the momentary travelling speed 20 kph and the scale field 23 shows 50 rpm, the numerical field 27 shows as the travelling time since the last reset 50 minutes as illustrated in FIG. 4 and the numerical field 31 shows the maximum speed. In contrast to the condition of the second operating mode which is automatically adjusted while the bicycle is at a stand-still, the separating line 35 between the hours and minutes digits flashes now.

As already mentioned, while the bicycle is being ridden, in the first operating condition, switchover to a higher measuring range of scale fields 19 and 23 is automatic. The scale field 19 switches from the lower to the higher measuring range when the actual travelling speed exceeds the upper limit value of the lower measuring range, i.e. 40 kph. The scale field 23 is shifted to the higher measuring range when the actual pedalling speed exceeds 90 rpm. Switchover from the higher measuring range to the lower measuring range is likewise automatic. The scale field 23 is switched back to the lower measuring range when the pedalling speed falls below the upper limit of the lower measuring range. The scale field 19 on the other hand is switched back to the lower measuring range when the display segment 21 indicates the value zero. Consequently, at travelling speeds in the region of the upper extreme reading of the scale relating to the lower measuring range, undesired hunting between the two measuring ranges can be avoided. Certainly, it is also possible by briefly actuating the operating key 15, to effect a brief change in operating mode, switching the measuring range of the scale field 19 from the higher to the lower range.

By means of the operating key 15, it is possible manually to shift the operating mode by briefly actuating the key while prolonged actuation for more than four seconds will switch the data display instrument to a condition in which the wheel diameter can (again by means of the operating key) be set to one of a plurality of predetermined diameters. By actuating the operating key 15 for an average duration of, for instance, two seconds, the values for travelling time since the last reset, the distance travelled since the last reset, the maximum speed and the average speed can be erased from the memory 3. To monitor that contact is being made, it is possible for all the pointer segments of the scale field 23 to appear while the operating key 15 is being actuated.

The data display instrument is preferably battery operated so that even over prolonged operating times, the total distance travelled can be kept available in the memory 7. However, it is also possible to use as a power source solar cells in conjunction with a rechargeable back-up battery. For starting up from the operating condition which occurs when the battery is inserted, there can be provision for the smallest value of wheel diameter stored in the memory 7 always to be adjusted if there is no prior adjustment of wheel diameter. If the operating mode is changed by actuation of the operating key 15, then preferably there is provision whereby, eight seconds after the last actuation of the operating key 15, the control device 9 is automatically switched back into that operating mode which would occur according to the travelling speed or the period which has elapsed since the bicycle was immobile.

While specific embodiments of the invention have been shown and described in detail to illustrate the application of the inventive principles, it will be understood that the invention may be embodied otherwise without departing from such principles.

What we claim is:

1. A data display instrument for a bicycle, comprising:
    (a) a wheel rotation sensor for generating plural pulse signals at a rate corresponding to the rotary speed of a wheel of the bicycle,
    (b) computing means responsive to the pulse signal for generating data signals for a plurality of types of information based on the travelling speed and the distance travelled,
    (c) visual display means for displaying information of the data signals, and
    (d) control means for clearing, in dependence on the pulse rate of the pulse signals, the display means for display of a first group of types of information when the pulse rate represents a travelling movement of the wheel and for display of a second group of types of information when the pulse rate approaches zero.

2. A data display instrument according to claim 1, wherein the control means clears the display means for the duration of a predetermined time interval for the display of the second group of types of information and subsequently clears the display means for display of a third group of types of information when the pulse rate of the pulse signal from the wheel rotation sensor approaches zero when the predetermined time interval has elapsed.

3. A data display instrument according to claim 2, wherein the third group of types of information includes at least one of the following data signals:
   a data signal ascertained by the computing means and representing the total distance travelled, and
   a data signal representing the diameter of the wheel.

4. A data display instrument according to claim 1, wherein the computing means includes reset means, the computing means generating, for the first group of types of information data signals, which represent at least one of:
   distance travelled since last actuation of the reset means, and
   average travelling speed since last actuating the reset means,
and, for the second group of types of information, the computing means generating data signals which represent at least one of:
   total travelling time completed by the bicycle since last actuation of the reset means, and
   maximum travelling speed reached since last actuation of the reset means.

5. A data display instrument according to claim 4, and further comprising a single operating key connected to said computing means so as to clear the groups of types of information for display in a predetermined cyclic sequence when actuated for a period of less than a predetermined first time interval, reset the computing means when actuated for a period of time which is greater than the predetermined first time interval but which is less than a predetermined second time interval, and set the computing means to a programming mode when actuated for a period of time greater than the second predetermined time interval, in which programming mode by repeated actuation of the operating key a value for a diameter of the wheel from a plurality of diameter values stored in a memory of the computing means is established in a predetermined cyclic sequence for a subsequent generation of data signals.

6. A data display instrument according to claim 1, wherein a pedal rotation sensor is provided to generate a second pulse signal at a pulse rate corresponding to the rotary speed of a bicycle drive pedal, the computing means, in response to the pulse signal of the wheel rotation sensor, generating a first data signal representing momentary travelling speed of the bicycle and, in response to the second pulse signal from the pedal rotation sensor, generating a second data signal representing momentary pedalling speed, the visual display means including a liquid crystal display field provided so as to continuously indicate the first data signal and the second data signal on an analog scale field each while indicating the data signals of the first and second groups of types of information on at least one digital numerical field.

7. A data display instrument according to claim 6, wherein each of the analog scale fields is arranged to display in a low and in a high measurement range and wherein the control means changes the format of the display to the higher measurement ranges of the analog scale fields for display of the first and second data signal when the first and second data signal exceed a limit value from lower to higher values.

8. A data display instrument according to claim 7, wherein the control means changes the higher measurement range for display of the first signal to the low measurement range when the pulse rate of the wheel rotation sensor approaches zero and changes the higher measurement range for display of the second data signal to the low measurement range when the limit value from higher to lower values is exceeded.

9. A data display instrument according to claim 6, wherein upon a change of the first or the second data signal from a first value to a second value which differs from the first value by at least a difference of predetermined magnitude, the computing means changes in steps of the predetermined magnitude to the second value, the steps following consecutively at constant time intervals.

* * * * *